Patented May 5, 1953

2,637,534

UNITED STATES PATENT OFFICE 2,637,534

METHOD OF OBTAINING THE DISPERSION OF A FINELY DIVIDED SOLID MATERIAL IN A LIQUID

Michael Henry Miller Arnold, Birmingham, England, assignor to Postans Limited, Birmingham, England, a company of Great Britain No Drawing. Application April 10, 1951, Serial No. 220,351. In Great Britain May 6, 1950

2 Claims. (Cl. 259—1)

This invention has reference to a new or improved method of obtaining the dispersion of a finely divided solid material in a liquid.

In industrial processes considerable difficulty is experienced in obtaining the dispersion of a finely divided solid material in a liquid especially where the demands of the industry require that the particles should be as fine as possible and be as uniformly dispersed in the liquid as is possible as indeed is the case of the paint industry.

In connection with the dispersion of solids in liquid, and more particularly with the dispersion of pigments in liquid vehicles such as are used in the manufacture of paint, printing ink and similar products, it has been proposed already to accomplish dispersion by initially introducing dispersed solids and initially dispersed liquids simultaneously into a high intensity compressional wave field existing preferably in a gaseous medium so that the high degree of agitation produced by the compressional waves results in such an intimacy of mixture of the solid and liquid particles that a wetting of the individual solid particles is obtained.

It has also been proposed, instead of dispersing the liquid particles as mentioned in the preceding paragraph, to maintain the liquid in a fluid state and to blow the solid particles which are to be mixed with the liquid into the liquid whilst the liquid is in a state of intense compressional wave vibration.

It has also been proposed to prepare an emulsion of sulphur and cutting oils by causing sulphur particles and cutting oil to flow through a tube, at a station in which the liquid mixture is subjected to the effects of constantly emitted high frequency sound waves.

My invention is based upon the discovery that a more uniform and lasting dispersion can be attained in the case of a finely divided solid material by effecting dispersal in a carrier liquid of low viscosity and preferably of a volatile nature under the influence of ultrasonic vibrations, the low viscosity of the carrier liquid facilitating uniform dispersion whilst the volatile nature of the carrier liquid admits of the dispersion being evaporated to a predetermined solids content utilising the heat generated by the supersonic vibrations as the whole or part of the source of heat.

An example of the manner of performing the invention will now be given as applied to the production of a preparation consisting of a suspension of a finely divided pigment in a relatively volatile liquid of low viscosity which is intended for use subsequently in the manufacture of paints.

According to the said illustrative example the finely powdered pigment is added to and/or admixed with a relatively volatile carrier liquid of low viscosity such as white spirit or xylene.

This mixture of liquid and powdered pigment is then subjected to ultrasonic vibrations conveniently produced through the medium of a transducer of the magneto-striction type or of a Galton whistle.

The ultrasonic vibrations produce cavitation in the liquid which results in a uniform dispersion of the pigment particles throughout the body of the carrier liquid.

The subjection of the liquid to ultrasonic vibrations results in the production of heat and use is made of this heat which otherwise would be wasted, to evaporate part of the carrier liquid so as to produce a preparation having a desired solids concentration. Since the amount of heat so produced depends principally upon the duration and intensity of the ultrasonic vibrations, the heat developed may be either insufficient or excessive for producing the required result and hence in the former case supplemental heat may have to be applied whilst in the latter case the excess heat will require to be dissipated.

The preparation thus obtained may be stored in bulk and used subsequently for the manufacture of paints in accordance with the invention disclosed in the co-pending United States patent application Serial Number 220,352, filed April 10, 1951.

Instead of using a simple carrier liquid as aforesaid, a liquid mixture rich in a liquid of low viscosity may be used so that the mixture itself has a low viscosity.

Although the invention has been described in its application to the preparation of a suspension of powdered pigment in a carrier liquid for use subsequently in the manufacture of paints it is to be understood that the invention is also applicable to the dispersion of finely divided particles in liquid media for other purposes for example for the production of coloured plastics in which case the finely divided pigment particles may be uniformly dispersed in a carrier liquid and the preparation brought to a predetermined solids concentration in a manner similar to that described hereinbefore and this liquid preparation may subsequently be added to a syrup of a suitable plastic or to a plasticised plastic or to a mixture of solid plastic and plasticiser for the preparation of the particular coloured plastic in question.

I claim:

1. The new or improved method of obtaining the dispersion of a finely divided solid material in a liquid residing in the steps of mixing the finely divided material with a liquid of low viscosity and of a volatile nature, then subjecting the mixture to the influence of ultrasonic vibrations and utilising the heat developed to evaporate part of the liquid so as to produce a preparation having a desired solids content.

2. The new or improved method of obtaining the dispersion of a finely divided pigment in a carrier liquid for use subsequently in the manufacture of paints or coloured plastics residing in the steps of effecting an admixture of the finely divided pigment in a relatively volatile carrier liquid of low viscosity of the class consisting of white spirit and xylene, then subjecting the carrier liquid and the finely divided pigment to the influence of ultrasonic vibrations and utilising the heat produced to evaporate part of the carrier liquid to produce a preparation having a desired pigment concentration.

MICHAEL HENRY MILLER ARNOLD.

References Cited in the file of this patent

UNITED STATES PATENTS

| Number | Name | Date |
| --- | --- | --- |
| 1,738,565 | Claypoole | Dec. 10, 1929 |
| 2,163,649 | Weaver | June 27, 1939 |
| 2,163,650 | Weaver | June 27, 1939 |
| 2,498,737 | Holden | Feb. 28, 1950 |
| 2,524,573 | Robinson | Oct. 3, 1950 |